United States Patent [19]
Hart

[11] Patent Number: 5,551,379
[45] Date of Patent: Sep. 3, 1996

[54] MULTIPLE USE MOTION RESTRAINT DEVICE

[76] Inventor: Marcie J. Hart, 7175 Dalscote St., Hesperia, Calif. 92345

[21] Appl. No.: 423,013

[22] Filed: Apr. 17, 1995

[51] Int. Cl.⁶ .................................................. A01K 27/00
[52] U.S. Cl. ........................... 119/771; 119/797; 410/115
[58] Field of Search ................................... 119/770, 771, 119/784, 795, 797; 410/85, 86, 96, 110, 115; 280/802

[56] References Cited

U.S. PATENT DOCUMENTS

| | | | |
|---|---|---|---|
| D. 360,711 | 7/1995 | O'Neill | 119/771 X |
| 3,416,762 | 12/1968 | Headrick | 410/85 |
| 3,563,208 | 2/1971 | Nero | 119/770 |
| 4,244,670 | 1/1981 | Pidcock | 410/115 X |
| 4,252,084 | 2/1981 | Willow | 119/771 |
| 4,791,886 | 12/1988 | Anderson . | |
| 4,827,876 | 5/1989 | Krekelberg . | |
| 4,834,027 | 5/1989 | Meyer | 119/771 |
| 4,892,063 | 1/1990 | Garrigan . | |
| 4,899,694 | 2/1990 | Belluomini . | |
| 4,947,801 | 8/1990 | Glass | 119/771 |
| 4,958,597 | 9/1990 | Mildner . | |

*Primary Examiner*—Robert P. Swiatek

[57] ABSTRACT

A motion restraint device to secure cargo items and animals is attached at opposite ends to suitable cargo tie down hardware, mounted on a track cargo bed. The device includes a sectioned, adjustable support strap consisting of three, approximately equal in length, separate sections, connected together by two rings. Attached to each ring is one adjustable lead. A third adjustable lead is attached to the center portion of the support strap with a floating ring that allows transverse movement of the third lead along the center portion of the support strap that exists between the two rings. The ends of the support strap and leads having swivel bolt snap connectors attached for releasable installation of the device, for attachment to cargo items, multiple animals, and for configuring looped hand grips to use the device as an animal leash.

12 Claims, 9 Drawing Sheets

MULTIPLE USE MOTION RESTRAINT DEVICE

BACKGROUND—FIELD OF INVENTION

The invention relates to a multiple use motion restraint device. More specifically, the invention relates to safely sectoring cargo items and animals within the confines of a truck cargo bed and is also used as an animal leash, providing multiple animal attachments.

BACKGROUND-DESCRIPTION OF PRIOR ART

In a growing number of states, due to unrestrained dogs being either, thrown or jumping from the cargo bed of a moving truck, resulting in death of serious injury to the pet, laws have been implemented that require all animals to be securely tethered during transport.

Several patents have been issued for a variety of animal restraints. A thorough search of large chain stores that specialize in pet supplies, sporting goods stores, hunting supplies, discount stores, tack and feed stores, track accessory shops and mail order pet supply catalogs has shown that none of the existing patents have been discovered to be available.

U.S. Pat. No. 4,947,801 to Glass (1990), discloses a complex shock absorber that would require special tooling and extensive hand assembly, making these shock absorbers prohibitively expensive to manufacture. U.S. Pat. No. 4,899,694 to Belluomini (1990), shows a threaded rod, a minimum of three feet long, turn buckles, adjusting nuts, and an assortment of smaller hardware. The use of such a large quantity of hardware makes this product, not only cost prohibitive, but due to the unyielding nature of this design, along with the complexity of installation, makes this animal restraint a permanently installed device that significantly reduces cargo space. Another permanently installed apparatus is U.S. Pat. No. 4,791,886 to Anderson (1988). Although this device does not reduce cargo space, it does impact the type of cargo. Special provisions are required to protect the apparatus while hauling dirt or any like material that will clog or impede the free movement of the close fitting slider placed within a slotted track member mounted on the floor of the cargo area.

Research has shown reluctance on the part of track owners to install any type of hardware on the inside walls or floor of the cargo bed. This is due to resale considerations of the vehicle and the belief that these types of attachments undermine the integrity of wall strength and create rust potential. U.S. Pat. Nos. 4,791,886 to Anderson (1988), 4,834,027 to Meyer (1989), 4,899,694 to Belluomini (1990), and 4,947,801 to Glass (1990), implement attachments at one or both of these locations.

Prior art has not allowed consideration for cargo beds that have or will have a cargo bed liner installed. Because cargo bed liners are made from a hard plastic that does not conform perfectly to the shape of the side walls and floor channels of the cargo bed, a gap of various dimensions exists. On the side wall portion of the cargo bed, this gap can be three inches or more. Attempts to attach any type of hardware through the bed liner wall to the cargo bed wall creates several problems. To secure any type of mounting bracket or device will require that pressure be applied from the exposed or outside portion of the bed liner wall or floor, to the inside portion of the cargo bed wall or floor with the mounting hardware. The bed liner, being of molded plastic and having limited flexibility, will not withstand the stress of the pressure required to safely secure a hardware mount. This type of mount will pull the bed liner out of its preformed shape, resulting in eventual, if not immediate, damage to the bed liner and create a potentially dangerous situation for a pet in transport.

It is customary for the floor of a bed liner to be molded into a rolling corrugated pattern, about one inch in overall height, the average spacing of the grooves being one half inch apart. It would not be possible to securely install U.S. Pat. No. 4,791,886 to Anderson (1988). The invention is mainly comprised of a metal slotted track member of an unspecified width and height, that is almost a long as the length of a cargo bed. It is designed for attachment to the low portion of a track bed channel so as not to interfere with the hauling of cargo. With a cargo bed liner installed, Anderson's patent has to be mounted on top of the corrugated bed liner floor, thus protruding into the cargo area. Modification of the mounting hardware is required, and the inevitability of damage to the bed liner still exists. The problem of attaching an animal restraining device to a track cargo bed with a bed liner installed has not been previously recognized, identified or provided for by prior art.

U.S. Pat. No. 4,827,876 to Krekelberg (1989), shows a c-clamp design, identified as a c-shaped structure member, that could be used on a truck with a bed liner, although he does not identify that application. The open sides of the c-clamps are placed opposite each other, across the top of the flat rail portion that makes up the sides of the cargo bed. The fixed base of the c-clamp is placed directly onto the outside portion of the cargo side wall. The customary threaded shaft with a circular knob, used for tightening by rotation, has been replaced with a threaded shaft incorporating a hook eye in place of the knob. This modified c-clamp requires special tooling for the customized hook eye, making this design cost prohibitive as well. In addition, the lack of a knurled knob for tightening makes installation difficult. The pressure required to secure the c-clamps will produce scratched paint and dents to the track side walls. The risk of serious injury should also be pointed out. This will result by introducing an active animal into the cargo area of a moving vehicle with a hard metal object, such as a c-clamp, protruding into the cargo area at about neck or head level of an average size dog.

Another type of cargo bed attachment is found in U.S. Pat. Nos. 4,252,084 to Willow (1981), and 4,958,597 to Mildner (1990). Both propose a dog restraint attaching to the cargo bed of a track by placing the looped ends of each device around hooks attached to the outside walls of the cargo bed. Mildner claims the looped ends of his restraint will not slip from the cargo hooks, by using a hook and loop fastener to diminish the loop size. However, provisions have not been made for an adjustment device to remove any slack from the device once installed. One end will eventually work free due to the combination of stretching and constant movement of a tethered animal. Another draw back is, no additional length can be added to accommodate existing hooks other than the type he shows. If hooks are mounted specifically for one of these restraints, because there are no length adjusters, the location and placement of cargo hooks is critical, limiting the ease of application for each of these devices.

U.S. Pat. Nos. 4,791,886 to Anderson (1988), 4,827,876 to Krekelberg (1989), 4,899,694 to Belluomini (1990), and 4,958,597 to Mildner (1990), are designed for the attachment of one animal only. Although designed for one to two animals, U.S. Pat. Nos. 4,834,027 to Meyer (1989), and 4,252,084 to Willow (1981), use one central attachment axis for both animals. This allows the animals the mobility to cross over or under each other resulting, not only in tangled leads, but also tangled legs and necks. Another related prior art is U.S. Pat. No. 4,892,063 to Garrigan (1990). It too is designed for two or more animals, but is actually a dog walking leash. This leash also utilizes one axis for multiple attachments and would require significant additions and modifications to be used as a restraint for transporting animals in the cargo bed of a truck.

Deterrents for implementing certain materials in the construction of a dog restraining device limit the ease of application and use of existing prior art. Nylon rope does not weather well. Exposure to the elements causes the rope to dry and fray, restfiling in brittle splinters that break off easily and are almost invisible in your skin or an animal's nose, making removal very difficult. Chain is heavy and difficult to adjust in length. The use of leather in any type of dog related application, especially leashes, has practically been abandoned. Not only is leather expensive, it's a natural chewing attractant to most dogs.

The application and use of the above mentioned materials can be found in U.S. Pat. Nos. 4,252,084 to Willow (1981)- nylon rope, 4,827,876 to Krekelberg (1989)-leather and chain, 4,834,027 to Meyer (1989) -rope, and 4,947,801 to Glass (1990)-chain and flexible rope.

Allowances must be made that will allow the safe attachment of a restraining device to either, a dog collar with an attachment ring that is worn around the neck, or an animal body harness that has the attachment ring located just behind the shoulder area. Use of a body harness can add over one foot to an animal's leash range, making it possible for the animal to be thrown over the side of the truck and suffer hanging. A restraint lead must be adjustable in length to accommodate all types of collars and harnesses. This problem has not previously been addressed nor provided for in prior art.

Cosmetics are another consideration. Consumers are reluctant to purchase and use even the safest of devices if they feel the product is unattractive. Function is commonly sacrificed for cosmetic appeal. The problem existing here, prior art has provided for function only.

OBJECTS AND ADVANTAGES

Accordingly, several objects and advantages of my invention are the implementation of readily available hardware and materials. Thus eliminating the need for high cost, special tooling for modified parts and labor intensive assembly. Metal hardware has been kept to a minimum to keep product costs down.

The invention is designed, but not limited to, attachments to cargo tie down hardware. The tie down hardware is usually mounted on the top rails of the side walls of the cargo bed. The implementation of these tie downs, which are already installed in some cases, eliminates the need to provide additional or modified hardware specifically for an animal restraint.

Because the tie down hardware is usually mounted on the truck rails, inside and outside wall attachments can be made as well, there are very few, if any, restrictions in their application. The adjustable strap on this invention enables attachment to most placement locations of the tie down hardware.

Another advantage to the top rail attachment is the flexibility of hardware placement. Accommodations can be made for preexisting conditions. Conditions such as, a permanently installed tool bin behind the cab of a truck that extends the entire width or length of the cargo bed, partial camper shells, fifth wheel trailer tongues, and a cargo bed liner, to name a few.

Cargo bed liners have been designed to anticipate the attachment of cargo tie down hardware to the top rails. Two basic styles exist. One, is designed to cover the floor and side walls only, leaving the top rails exposed. The second style has a lip that extends across the top rails of the cargo bed. The highest degree of flexibility exists on this extended lip specifically for hardware attachments.

The preferred material for construction of the device is woven nylon webbing, such as that used in dog collars and leashes. However, the development and application of a similar material is anticipated. Not only is this strength tested webbing durable and washable, it holds up extremely well with exposure to the outside elements. In addition, because of the nature of the design, sections can be replaced independently of each other if required, extending the life of the device. This webbing is available in most fabric stores.

Along with the design, the use of the nylon webbing is a major contributing cosmetic factor, providing a wide range of colors. "Tape Craft Corporation," a major manufacturer of nylon webbing, offers a vast selection and customization of colors and color combinations. This color option allows the consumer to satisfy the desire for choice.

Additional objects and advantages of the present invention are:

(a) a design providing a separate point or axis of attachment for each animal, thus reducing tangling of the leads and animals;

(b) adjustable leads to accommodate the safe attachment to dog collars and animal harnesses;

(c) adjustable supporting strap to accommodate the various locations of cargo tie down hardware;

(d) installation and removal of the device in less than one minute;

(e) a device that has no impact on reducing cargo space;

(f) a device that doesn't require special provisions to protect it in place;

(g) a device that is reversibly attachable to the preferred location on the top rails of a cargo bed;

(h) to provide a secure attachment that won't slip off during transport;

(i) to provide consumers with a low cost, high quality, readily available, cosmetically appealing and safe device that enables them to effortlessly comply with the law when transporting animals.

Further objects and advantages are to provide a multiple use device. The device can be used inside a cargo bed to restrain animals and cargo items, separately or in combination. The device can also be used as an animal leash, accommodating multiple animal attachments. In addition, by employing the use of two devices together, large cargo items, tarps and moving blankets can be secured, whereby eliminating some of the problems associated with ropes that are too long, too short, tangled and knotted.

These and additional features of the associated objects and advantages of the invention will become apparent from a consideration of the ensuing description and drawings.

DRAWING FIGURES

In the drawings, closely related figures have the same number but different alphabetic suffixes.

Figure 1:
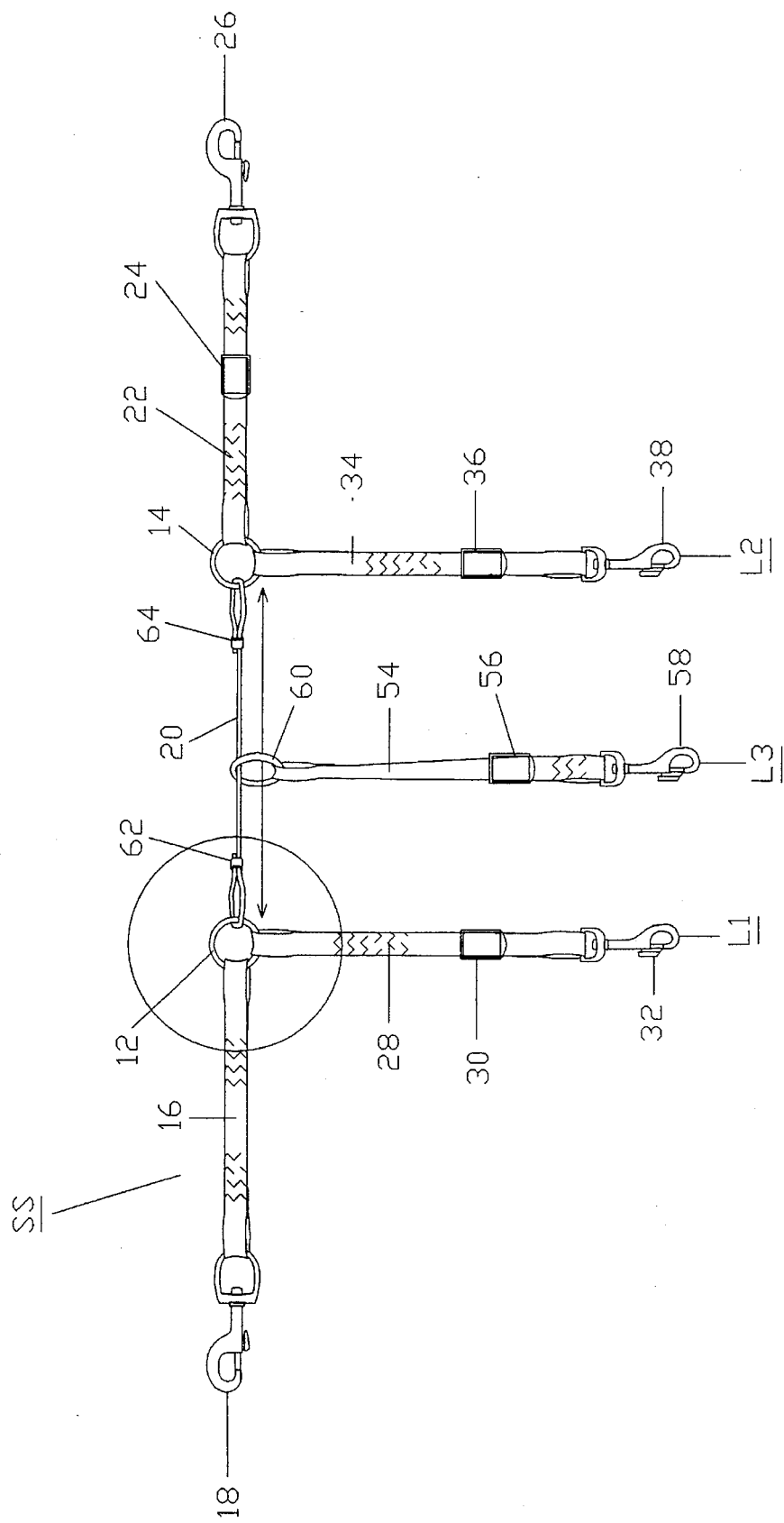
FIG. 1 shows a plan view of the preferred embodiment of my invention.

| | Reference Numerals In Drawings |
|---|---|
| 12. | ring type link |
| 14. | ring type link |
| 16. | support strap end |
| 18. | bolt snap |
| 20. | support strap center portion |
| 22. | support strap end |
| 24. | strap length adjuster |
| 26. | bolt snap |
| 28. | lead strap L1 |
| 30. | strap length adjuster |
| 32. | bolt snap |
| 34. | lead strap L2 |
| 36. | strap length adjuster |
| 38. | bolt snap |
| 40. | cargo tie down hardware mount |
| 42. | cargo tie down hardware mount |
| 44. | dog collar |
| 46. | animal body harness |
| 48. | tool bin |
| 50. | top rail |
| 52. | dog collar |
| 54. | lead strap L3 |

-continued

| | Reference Numerals In Drawings |
|---|---|
| 56. | strap length adjuster |
| 58. | bolt snap |
| 60. | ring type link |
| 62. | cable clamp |
| 64. | cable clamp |
| 66. | cargo tie down hardware mount |
| 68. | tool box handle |
| 70. | bucket handle |
| 72. | cargo tie down hardware |
| 74. | bolt snap |
| 76. | bolt snap |
| 78. | lead strap L4 |
| 80. | bolt snap |
| 82. | bolt snap |
| 84. | strap length adjuster |
| 86. | lead strap L5 |
| 88. | bolt snap |
| 90. | hand grip |
| B. | truck cargo bed |
| L1. | lead 1: strap 28, adjuster 30 |
| L2. | lead 2: strap 34, adjuster 36 |
| L3. | lead 3 (floating): strap 54, adjuster 56, ring 60 |
| L4. | auxiliary lead: strap 76, adjuster 78, bolt snaps 74, 80 |
| L5. | auxiliary lead: strap 86, adjuster 84, bolt snaps 82, 88 |
| P. | pick up truck |
| SS. | support strap: straps 16, 20, 22, rings 12, 14 |
| T. | tarp |

DESCRIPTION—FIGS. 1 TO 5 AND 8

FIG. 1 shows a plan view of my multiple use motion restraint device. The device is comprised of a support strap SS and three leads, L1, L2 and L3. In the preferred embodiment, the support strap and leads are made from a nylon webbing, which is available in a variety of colors and widths from Tape Craft Corporation of Anmston, Ala. However, any material that can meet strength requirements and weathers well, such as a nylon/rayon blend, for example, could be substituted.

Support strap SS is sectioned into three pans by two rings or ring type links, 12 and 14. The sizes of the rings are relative to the width of the nylon webbing. Not only are rings 12 and 14 an axis point for leads L1 and L2, they also defer stress, due to the activity of a tethered animal, from the attachment point of the secured ends of the leads to the support strap. Although plastic rings could be utilized, their inferior strength and durability under stress could undermine the safety and quality of the invention.

Figure 4:
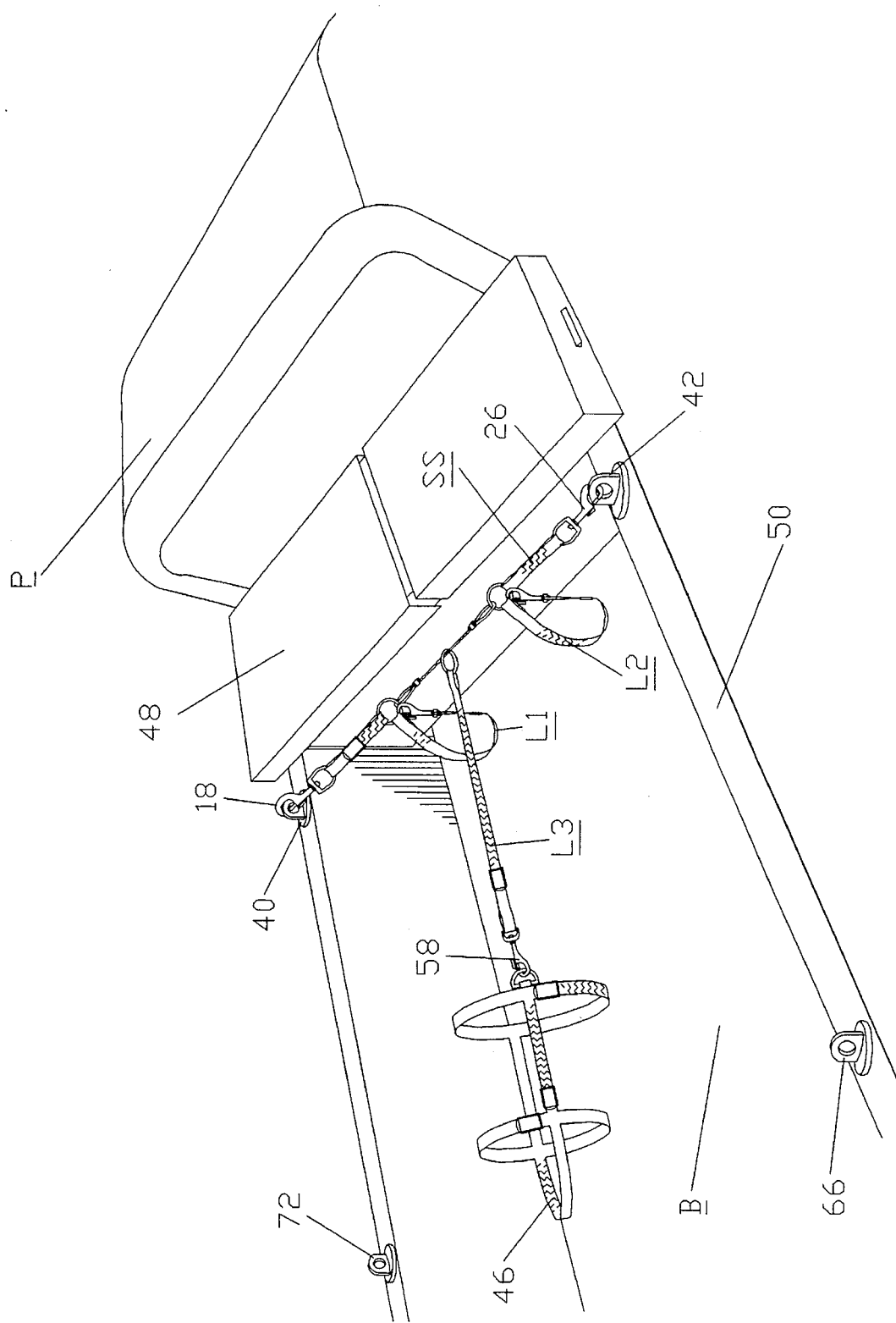
FIG. 4 shows a perspective view of the device installed across the top width of a cargo bed, illustrating installation compatibility with preexisting conditions such as a tool bin.
Figure 5:
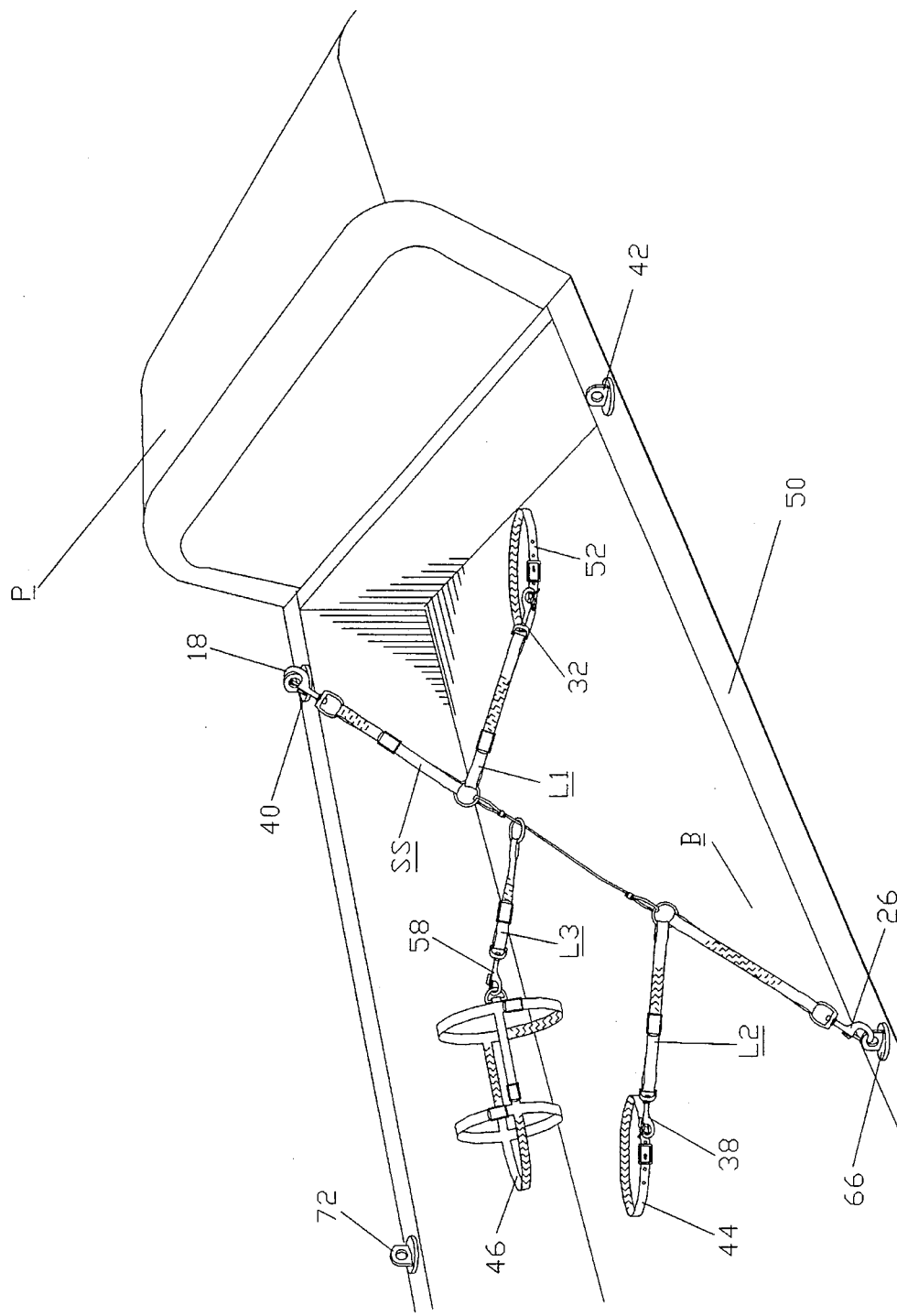
FIG. 5 shows a perspective view of the device installed across the top cross-length of a cargo bed, illustrating the manner in which animals are restricted from exceeding the confines of the track cargo bed and depicting the versatility of installation.

The assembled length of each section of support strap SS is approximately one third its overall length, according to its application. FIG. 4 and FIG. 5 demonstrate different length requirements. An advantage to a sectioned support strap is that sections can easily be replaced independently of each other, extending the life of the device. Nylon webbing is easy to work with and can be found in most fabric stores.

To construct the device of FIG. 1, one end of strap 16 is passed through the eye of bolt snap 18 and folded back upon itself. The end is secured by way of stitching, glue, rivets, heat fusion, or a combination thereof. The aforementioned methods are implied when reference if made to a strap or section end being secured, unless otherwise specified. The opposing end of strap 16 is passed through ring 12 and secured.

The preferred material for the center portion 20 of support strap SS is plastic coated metal cable. Although other materials, such as nylon webbing, rope or chain, could be substituted, plastic coated metal cable provides the most durable and least frictional surface with a minimum of drag resistance for lead L3. One end of strap 20 is passed through ring 12, looped back upon itself, and secured with cable clamp 62. The opposing end is threaded completely through ring 60 of lead L3, then passed although ring 14 and secured with cable clamp 64. Lead L3 can now transverse the length of strap 20, but is restricted from straps 16 and 22 by rings 12 and 14. Rings 12 and 14 have a secondary role as stops. Section 20 also provides a separation for lead attachments L1 and L2, significantly reducing the problems associated with tangled leads.

Figure 8:
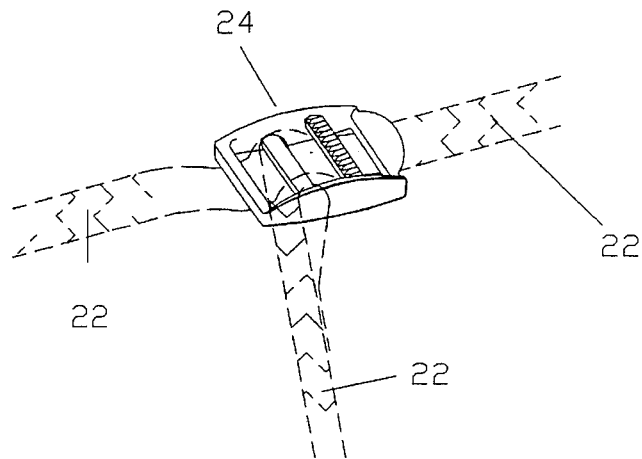
FIG. 8 shows a perspective view of a common strap length adjuster, illustrating how strap length is added or taken away according to the direction you slide the adjuster.
Figure 9:
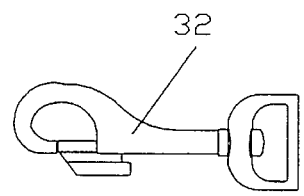
FIG. 9 shows a side view of the preferred bolt snap attached to the ends of all leads.
Figure 10:
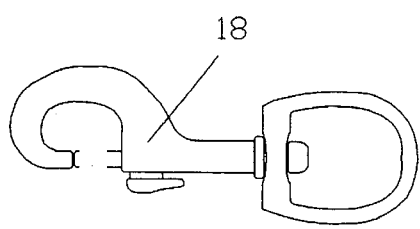
FIG. 10 shows a side view of the preferred bolt snap attached to the support strap ends.
Figure 11:
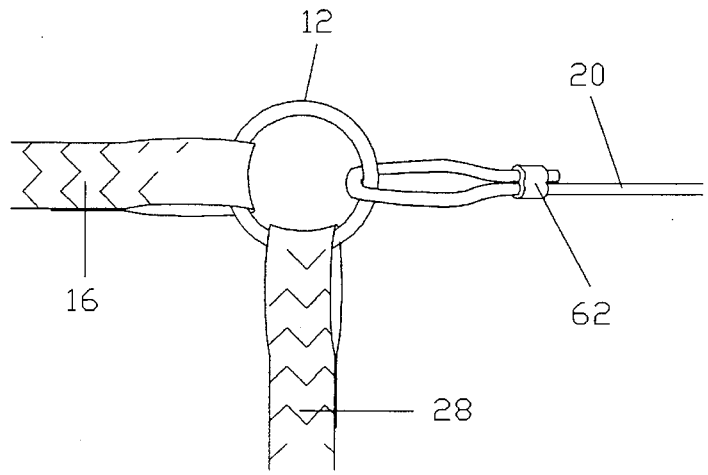
FIG. 11 is an enlarged view of the circled area of FIG. 1.

The third section of support strap SS is adjustable. One end of strap 22 is secured to a strap length adjuster 24, such as the one shown in detail in FIG. 8. The opposing end of strap 22 is then passed through the eye of bolt snap 26 and threaded back through the top of length adjuster 24 until a distance of approximately one foot of webbing exists between strap length 24 and the eye of bolt snap 26. The loose end of strap 22 is then passed through ring 14, folded back upon itself and secured. This allows sufficient length to custom fit support strap SS to a wide variety of cargo tie down hardware locations on truck cargo bed B.

Lead L1 is constructed by securing one end of strap 28 to strap length adjuster 30, passing the opposing end through the eye of bolt snap 32 and threading it back through the top of adjuster 30 until a distance of approximately one foot of strap exists between adjuster 30 and the eye of bolt snap 32. The free end of strap 28 is then passed through ring 12 and secured. Lead L2 is constructed in the same manner as lead L1. Strap 34 is secured to length adjuster 36. The opposing end is passed through the eye of bolt snap 38 and threaded back through the top of length adjuster 36 until a distance of approximately one foot of strap exists between adjuster 36 and the eye of bolt snap 38. The loose end of strap 34 is then passed through ring 14 and secured. Lead L3 is constructed in the same manner as leads L1 and L2. Strap 54 is secured to strap length adjuster 56. The opposing end is passed through the eye of bolt snap 58 and threaded back through the top of length adjuster 56 until a distance of approximately one foot of strap exists between adjuster 56 and the eye of bolt snap 58. The loose end of strap 54 is then passed through ring 60 and secured. The assembled lengths of leads L1, L2 and L3 are equal to the distance of approximately one third the width of a truck cargo bed. The range of motion of a tethered animal is controlled by lead length adjusters 30, 36 and 56. This adjustment feature allows quick and easy customization for a variety of cargo items, animal sizes, and animal collar types.

Figure 2:
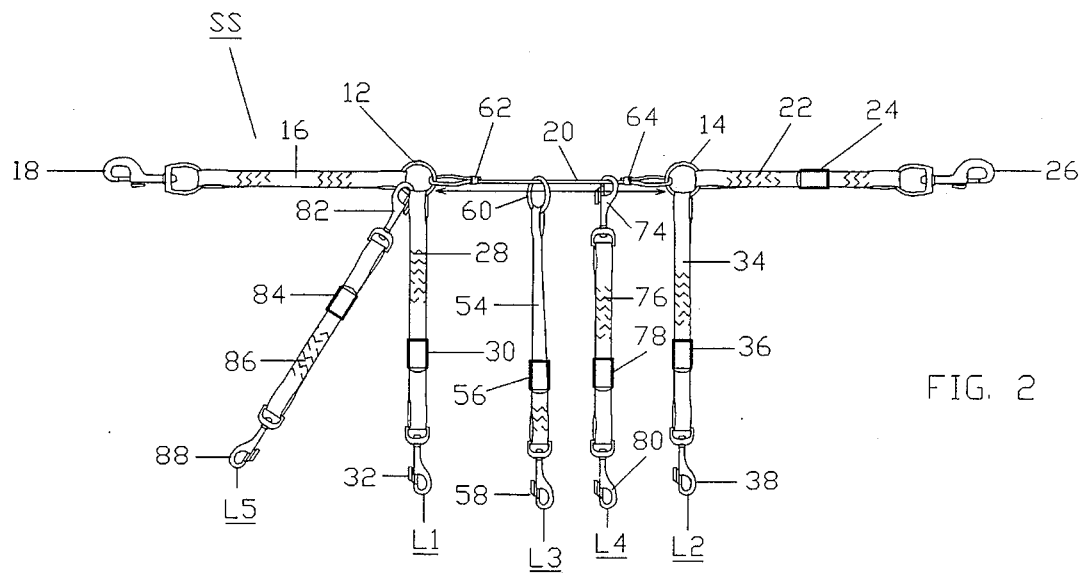
FIG. 2 shows a plan view of the preferred embodiment depicting two possible placement locations for two auxiliary leads.

FIG. 2 is a plan view of the preferred embodiment of my invention, depicting two of the possible placement locations of additional or auxiliary leads L4 and L5. To construct lead L4, strap 76 is secured to strap length adjuster 78, passed through the eye of bolt snap 80, and then threaded back through the top of adjuster 78 until a distance of approximately one foot of strap exists between adjuster 78 and the eye of bolt snap 80. The loose end of strap 76 is then passed through the eye of bolt snap 74 and secured. Lead L5 is constructed in the same manner as lead L4. Strap 86 is secured to strap length adjuster 84, passed through the eye of bolt snap 88 and then threaded back through the top of adjuster 84 until a distance of approximately one foot of strap exists between adjuster 84 and the eye of bolt snap 88. The loose end of strap 86 is then passed through the eye of bolt snap 82 and secured. These auxiliary leads are most beneficial for the above average transporting needs of animal breeders and hunters, to name two.

Figure 3:
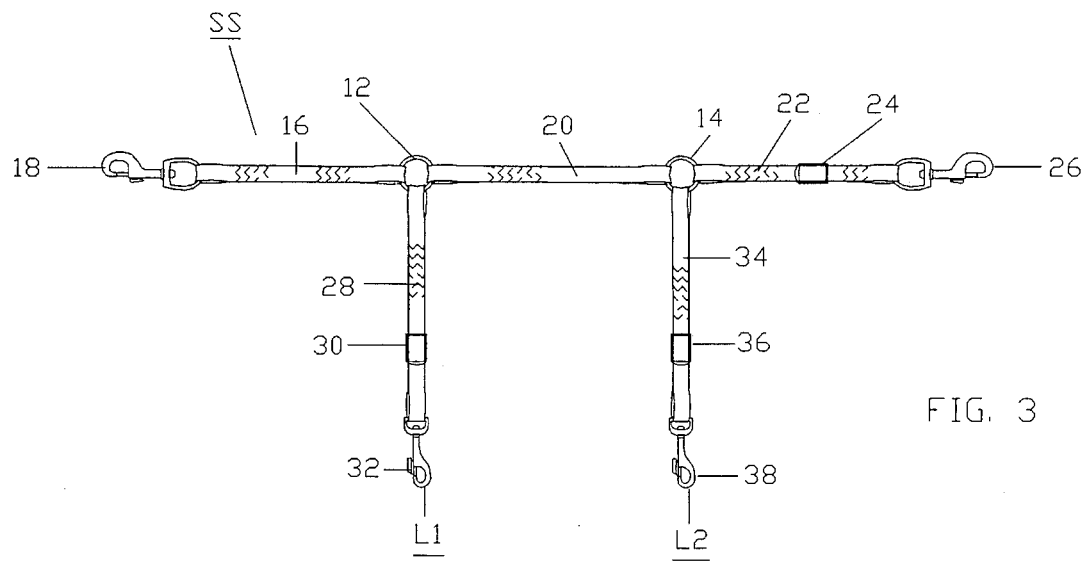
FIG. 3 shows a plan view of a simplified modification of the preferred embodiment.

FIG. 3 is a plan view of a simplified modification of my invention to provide a more economical version of my device. Lead L3 has been eliminated. Because there is no frictional, transverse movement across the center portion of support strap SS, strap 20, the plastic coated metal cable, is replaced with the lower priced nylon webbing, thus reducing the cost of materials by eliminating the plastic coated metal cable, clamps 62 and 64, strap 54, adjuster 56, ring 60, and bolt snap 58.

OPERATION—FIGS. 1, 4 TO 7, AND 12 TO 14B

Figure 6:
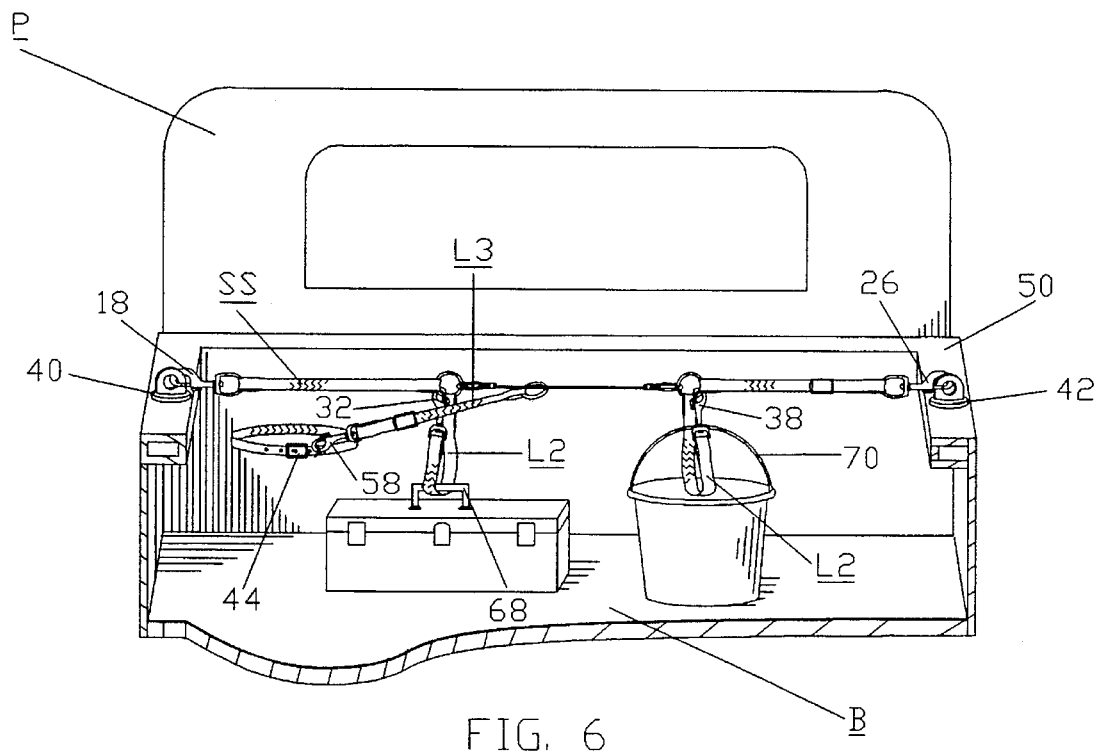
FIG. 6 shows a partially cut away rear view, depicting the device used to secure a combination of cargo items.
Figure 7:
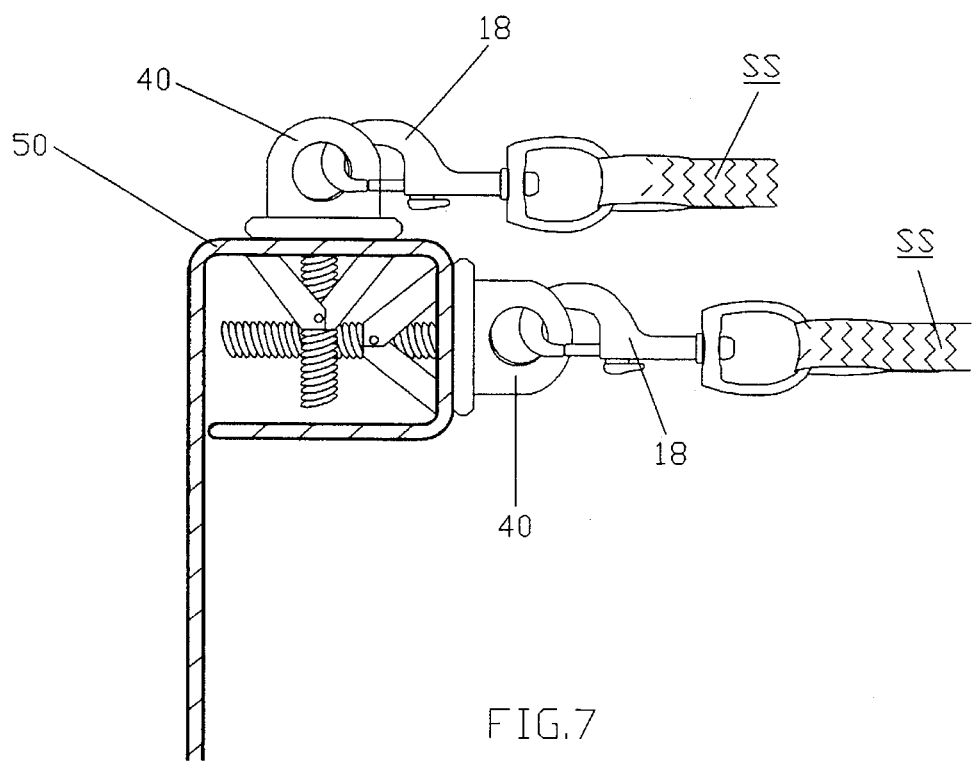
FIG. 7 shows an enlarged, cut away plan view, depicting the top rail of a track cargo bed with a common cargo tie down mount, as well as two possible mounting locations, and how the device is attached to the tie down hardware.

As shown in the perspective view of FIG. 4 and the partially cut away rear view of FIG. 6, installation of the device to track cargo bed B, is achieved by attaching bolt snap 18 to cargo tie down mount 40, and bolt snap 26 to mount 42. FIG. 7 is an enlarged, cut away plan view, depicting a common cargo tie down mount and how it is installed in two of the possible locations on the top rail 50 of truck cargo bed B. Because the device has no defined left or fight side and is reversible, bolt snap 26 may be attached to mount 40 with bolt snap 18 attached to mount 42, as well. Any slack in support strap SS is removed by sliding the excess length from strap 22 through the top of length adjuster 24 until taut. The leads or lead of choice is attached to dog collar 44 or body harness 46, and is then adjusted as required for the animal size and collar type. Idle leads are secured out of the way, with the bolt snap provided on the end of each lead, to a respective ring or ring type link as shown in FIG. 4.

FIG. 5 shows a perspective view of the device installed across the top cross-length of cargo bed B. The additional room provided by utilizing the length of cargo bed B is optimized without departing from the spirit of the invention. the overall length of support strap SS is increased relative to the cross-length of a track cargo bed. To install, select any bolt snap on one end of support strap SS, and attach it to any cargo tie down mount. Attach the bolt snap on the opposite end of support strap SS to the cargo tie down mount located diagonally across from the first selected mount. Any slack in support strap SS is removed by sliding the excess length from strap 22 through the top of length adjuster 24 until taut. The bolt snaps that terminate on the ends of all leads are then attached to dog collar 44, an animal body harness 46, or secured out of the way. FIG. 5 illustrates all the leads being utilized with ample room to add auxiliary lead attachments.

Another application of use is depicted in FIG. 6, a partially cut away plan view of truck cargo bed B. Many track cargo beds are minus a tailgate for a variety of reasons. They are not always standard equipment and are considered an option when purchasing a new track. They are frequently stolen and expensive to replace. Also, driving without a tail gate, or with the tail gate down, can significantly improve on gas mileage. However, even without a tail gate, people still carry unsecured cargo in the cargo bed, relying on inertia to keep the cargo items in place. Not only are our highways littered with these unsecured items, traffic accidents have resulted, in some instances, from drivers swerving out of their lane and into another, in an attempt to miss an object that has been thrown from a cargo bed into a traffic lane.

In FIG. 6, lead L1, inadvertently marked L2, is passed through handle 68 of a common tool box, looped upward, and attached to support strap SS ring 12. Lead L2 secures a bucket by being passed through bucket handle 70, looped upward and attached to support strap SS ring 14. Lead L3 is attached to dog collar 44. This illustrates the versatility of the device to perform several combined applications without restricting its function to one application at a time, such as just cargo items or just animals. A vast selection of cargo, other than the items depicted, can be restrained as well. For example, a ladder can be secured by attaching one or more leads to a step rung. Plastic grocery bags are held relatively in place by passing a lead through the hand carry holes and attaching its bolt snap to a respective ring. Ice chests, lawn mowers, trash cans, bicycles, antifreeze bottles, suitcases, and more, can all be easily secured to the confines of a truck cargo bed with very little effort.

Figure 12:
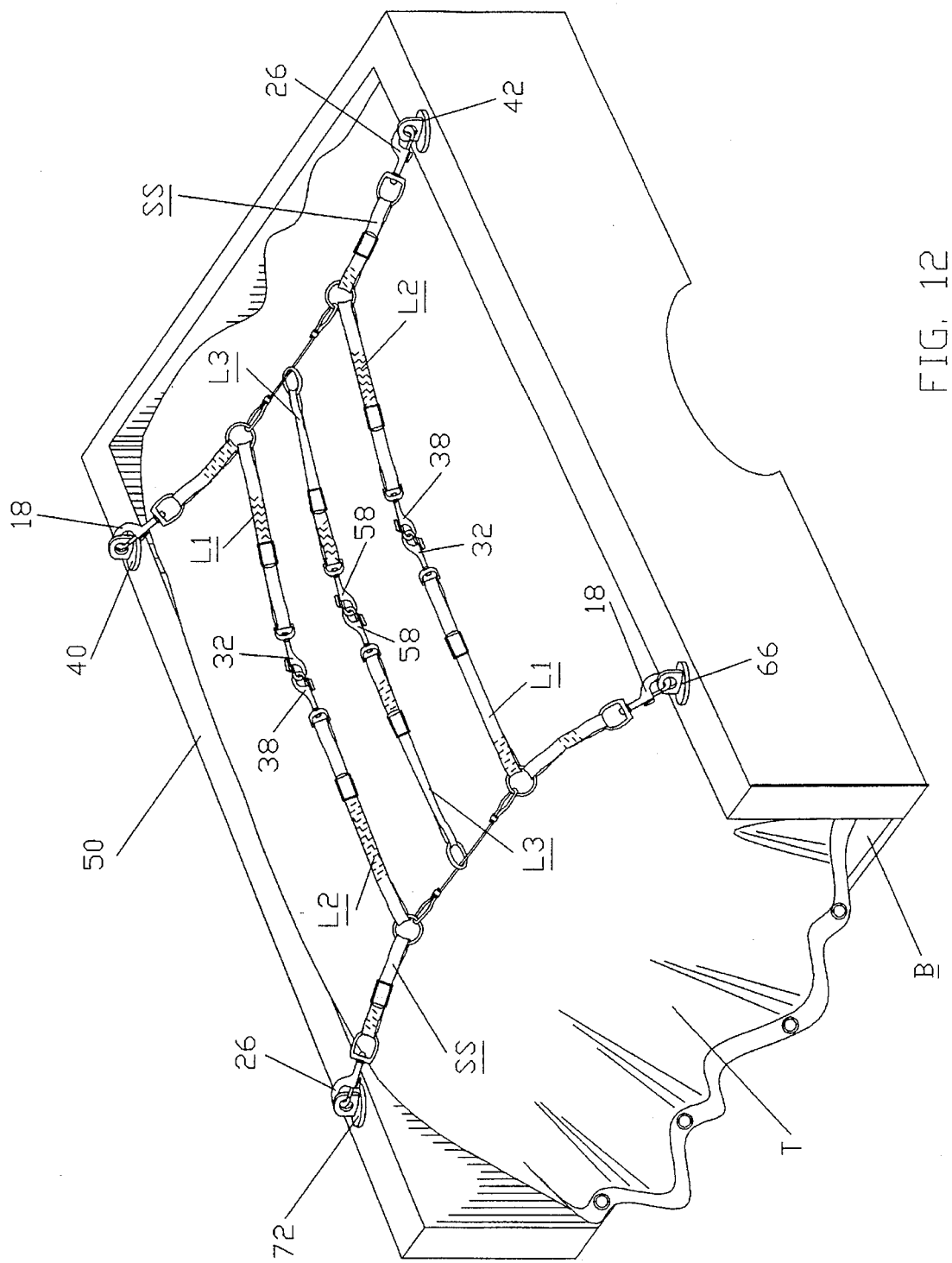
FIG. 12 shows a perspective view of two devices used to secure a tarp in the cargo bed of a pick up track.

FIG. 12 shows a perspective view of track cargo bed B, depicting a fourth mode of use for the device. This application utilizes two devices of the preferred embodiment as shown and constructed in detail in FIG. 1. The purpose being to eliminate, in some cases, the problems associated with knotted ropes that are too short or long, used for securing a tarp T, or similar type cargo cover, such as plastic or a moving blanket.

Once tarp T or a cargo cover is in place, installation is easily accomplished by installing the first device to cargo tie down mounts 40 and 42 with bolt snaps 18 and 26. The second device is attached to cargo tie down mounts 72 and 66 with bolt snaps 26 and 18. The length of tends L1, L2 and L3 of both devices are then extended, using strap length adjusters 30, 56 and 36, until a sufficient length allows the connection of bolt snaps 32, 58 and 38 of the first device to bolt snaps 38, 58 and 32 of the second device. After the leads are connected to each other with the bolt snaps, any remaining slack can then be removed with strap length adjusters 30, 56 and 36 on one or both devices. It is with this application in mind, that approximately one foot of additional webbing is provided in the adjustment length of the leads.

Figure 13A:
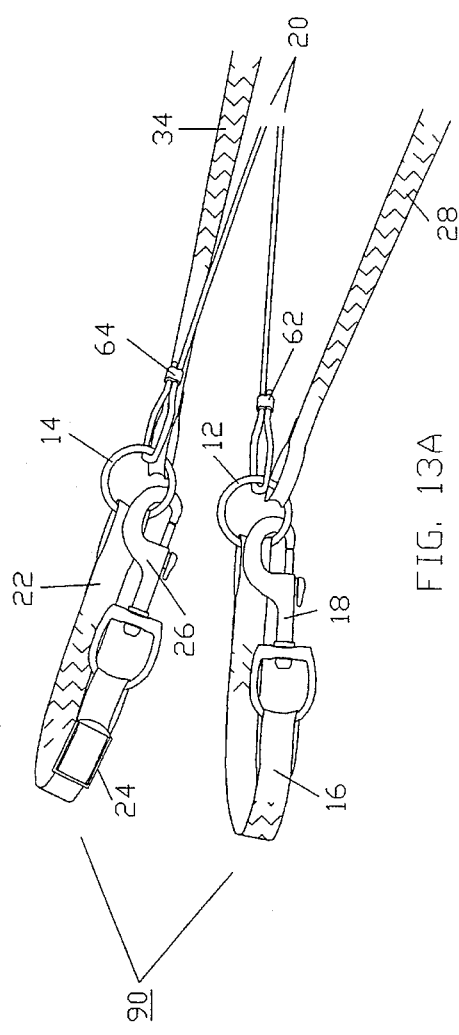
FIG. 13A is an enlarged view of the circled area of FIG. 13, depicting how the hand grips are configured.
Figure 13:
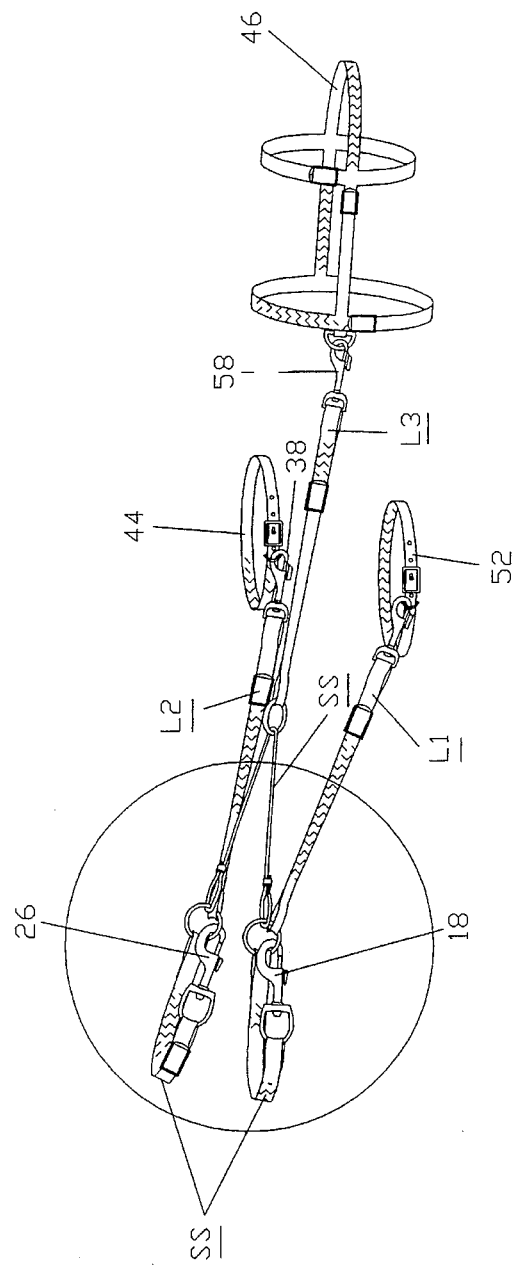
FIG. 13 shows a side view of the device used as an animal leash by configuring the support strap ends into hand grips.

The application of use for my device is not limited strictly to a truck cargo bed. As shown in the side views of FIG. 13 and FIG. 14, the device is easily used as an animal leash by configuring hand grips with existing hardware. In FIG. 13A, an enlarged view of the circled area of FIG. 13, two hand grips are configured, using the ends of support strap SS. Bolt snap 18 is attached to ring 12, creating a looped closure, or hand grip 90, with strap 16. Bolt snap 26 is then attached to ring 14, creating a second looped closure, or hand grip 90, with strap 22. Although not necessary and not demonstrated in the drawings, by securing rings 12 and 14 together with either bolt snap 26 or 18, the stress of several animals pulling in opposite directions, is relieved from hand grips 90, and centralized to the rings and bolt snaps. This leash configuration provides a forward position for the animal attached to L3, reducing lead tangling and bunching of the animals.

Figure 14:
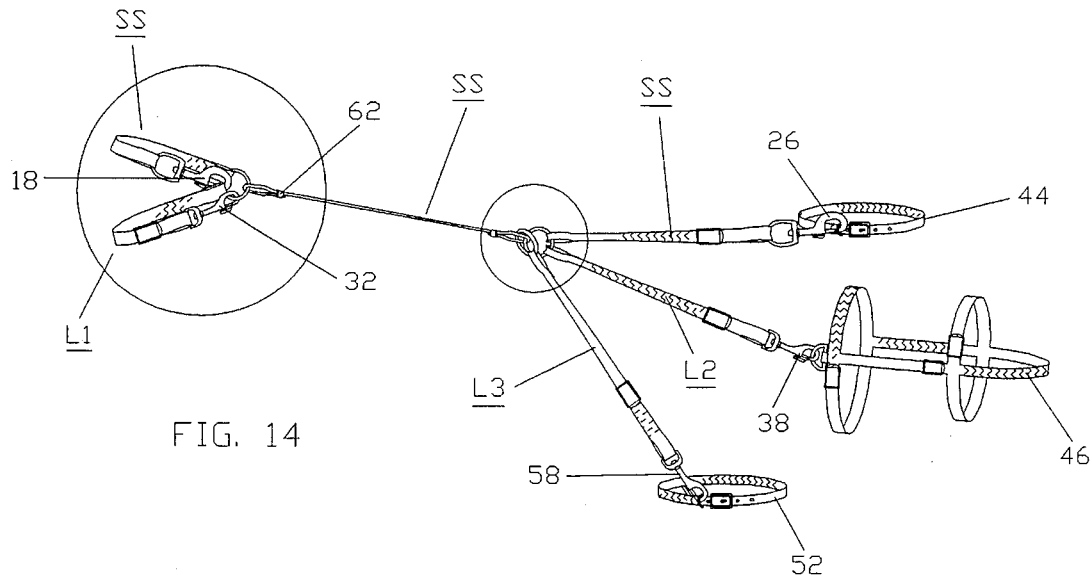
FIG. 14 shows a side view of the device used as an animal leash by configuring a support strap end and a lead into hand grips.
Figure 14A:
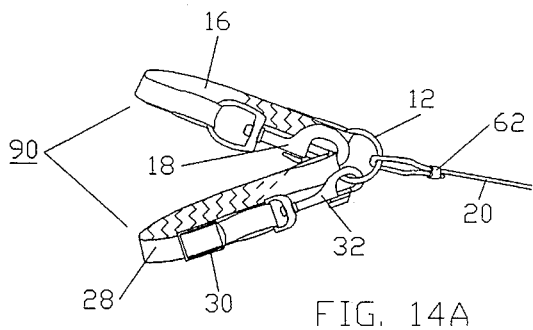
FIG. 14A is an enlarged view of the circled area of FIG. 14, depicting how the hand grips are configured.
Figure 14B:
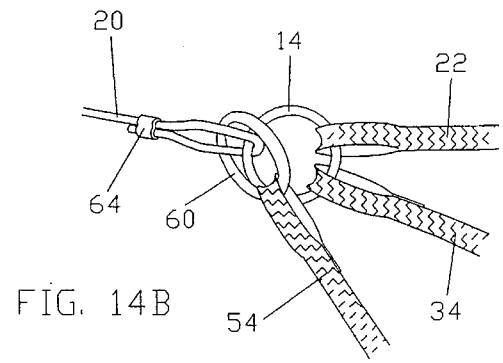
FIG. 14B is an enlarged view of the second circled area of FIG. 14, illustrating how the rings of the support strap function as stops for the ring and lead that transverses the center portion of the device.

The side view of FIG. 14 illustrates the additional leash length this configuration provides by utilizing the fully extended length of center portion 20 of support strap SS. FIG. 14A is an enlarged view of FIG. 14, depicting another possible configuration for hand grips 90. Bolt snap 18 on one end of support strap SS is attached to ring 12, creating hand grip 90 with strap 16. Bolt snap 32 on the end of lead L1 is also attached to ring 12, creating a second hand grip 90 with strap 28. FIG. 14B is an enlarged view of the second circled area of FIG. 14, illustrating how rings 12 and 14 function as stops for ring 60 of lead L3, and the ample room available for attaching auxiliary leads L4 and L5 to rings 14 and 16, if needed.

Although not depicted in the drawings, in addition, while the device is being utilized as a leash, hand grips 90 can be opened and secured around a stationary object, such as a picnic table leg or sign post. This allows the freedom to temporarily secure the animals while you are, for example, out jogging with the dogs and want to pick something up at the store, or while at a park that has an animal leash law.

SUMMARY, RAMIFICATIONS, AND SCOPE

The invention fulfills the above stated needs and methods are disclosed for securing cargo items and animals in the cargo bed of a track. In addition, by using the existing hardware of the multiple use motion restraint device, a multiple animal leash, having looped hand grips, is configured.

Accordingly, the reader will see that the device of this invention provides a highly reliable, safe, yet economical restraint that can be used by persons of almost any age. In addition it permits easy installation and removal, enhanced with its reversible feature, with no impact on reducing cargo space;

special provisions for cargo beds that have tool bins, cargo bed liners and fifth wheel trailer hook ups, do not restrict application;

it provides a separate, rotational axis for each lead attachment, reducing lead cross overs and tangling;

it provides adjustment features that allow a custom fit to a variety of cargo tie down hardware locations, cargo items, animal sizes and collar types;

it provides a light weight, quality device that can be easily manufactured from readily available materials, it can be washed and requires very little room for storage when not in use;

it provides a cosmetically appealing device, available in a wide variety of colors that is design compatible with the existing nylon collars and leashes available on the market today;

it provides multiple applications by easily being configured. It can be used to transport animals, as a leash, as a cargo tarp tie down, or utilized to secure a variety of cargo items, such as tool boxes, groceries and suitcases;

it allows easy compliance with amimal restraint laws; and it reduces litter and potential traffic accidents by eliminating the possibility of objects leaving the cargo bed while in transport.

While my above description contains many specifics, these should not be construed as limiting the scope of the invention but as merely providing illustrations of some of the presently preferred embodiments of this invention. For example, the rings of the support strap could have other shapes, such as square, triangular, rectangular, a swivel with three strap eyes, etc.; or the rings could be eliminated by securing the leads directly to the support strap in a variety of configurations. Other materials could be used, such as leather, chain, rope, metal cable, etc.; different types of bolt snaps or openable connectors could be substituted.

Thus the scope of the invention should be determined by the appended claims and their legal equivalents, rather than by the examples given.

I claim:

1. A multiple use motion restraint device that restricts the movement range of cargo and animals inside the cargo area of a pick up truck, comprising:

(a) a support strap of flexible composition and of a predetermined adjustable length, said support strap having two opposite ends and a center portion extending therebetween, (b) said opposite ends having an openable connector means, conditioned for releasable engagement to cargo tie down hardware mounted on the top rail portion of a cargo bed, secured to said ends, whereby said support strap is retained in a generally taut position, (c) said support strap being comprised of three approximately equal in length, separate sections consecutively joined together with two ring type links, said center portion existing in the middle span between two said two links, (d) a plurality of leads of a predetermined adjustable length, with said support strap composition, having two opposite ends, one end of two said leads being affixed to said links, respectively, (e) said opposite ends of all said leads having an openable connector means, whereby releasable engagement to an animal collar or cargo item is achieved by directly attaching said openable connector means to said animal collar or said cargo item, or by passing said lead through a handle or opening of said cargo item and attaching said openable connector means directly onto said lead, said support strap, or said link.

2. The multiple use motion restraint device that restricts the movement range of cargo and animals inside the cargo area of a pick up track according to claim 1 wherein including a third lead, one end being secured to a third ring type link, the opposite end having said openable connector means, said center portion of said support strap being passed through said third link of said third lead before being secured to said support strap said links, thus allowing transverse movement of said third lead the length of said center portion of said support strap, with said support strap said links serving as stops.

3. The multiple use motion restraint device that restricts the movement range of cargo and animals inside the cargo area of a pick up track according to claim 2 wherein the center portion is flexible plastic coated metal cable.

4. The multiple use motion restraint device that restricts the movement range of cargo and animals inside the cargo area of a pick up track according to claim 1 wherein further including two auxiliary leads having an openable connector means affixed to both ends, conditioned for releasable engagement from said support strap and said links to said cargo item and said animal collar.

5. The multiple use motion restraint device that restricts the movement range of cargo and animals inside the cargo area of a pick up truck according to claim 1 wherein said openable connector means are spring action, swivel bolt snap connectors.

6. The multiple use motion restraint device that restricts the movement range of cargo and animals inside the cargo area of a pick up track according to claim 1 wherein said flexible composition is woven nylon webbing.

7. A multiple use motion restraint device that restricts the movement range of cargo and animals inside the cargo area of a pick up truck, configured into an animal leash comprising:

(a) a support strap of flexible composition and of a predetermined adjustable length, having two opposite ends and center portion extending therebetween, (b) said support strap being comprised of three approximately equal in length, separate sections, consecutively joined together with two ring type links, said center portion existing in the middle span created between said two links, (c) a plurality of leads of a predetermined adjustable length, with said support strap composition, having two opposite ends, one end of two said leads being affixed to said links, respectively, (d) said opposite ends of said support strap and said leads having an openable connector means whereby releasable engagement of any end to any corresponding link creates a hand grip loop or multiple loops therefrom, any remaining said end is attached to an animal collar, idle said ends are secured by said openable connector means to any corresponding said link.

8. The multiple use motion restraint device that restricts the movement range of cargo and animals inside the cargo area of a pick up track, configured into an animal leash according to claim 7 wherein further including a third lead, one end being seemed to a third ring type link, the opposite end having an openable connector means for releasable engagement to said animal collar, said center portion of said support strap being passed through said third link of said third lead before being seemed to said support strap links, thus allowing a forward position to reduce bunching of multiple animal attachments.

9. The multiple use motion restraint device that restricts the movement range of cargo and animals inside the cargo area of a pick up track, configured into an animal leash according to claim 8 wherein the center portion is flexible plastic coated metal cable.

10. The multiple use motion restraint device that restricts the movement range of cargo and animals inside the cargo area of a pick up truck, configured into an animal leash according to claim 7 wherein further including two auxiliary leads having an openable connector means affixed to both ends, conditioned for releasable engagement from said support strap and said links to said animal collar.

11. The multiple use motion restraint device that restricts the movement range of cargo and animals inside the cargo area of a pick up mack, configured into an animal leash according to claim 7 wherein said openable connector means are spring action, swivel bolt snap connectors.

12. The multiple use motion restraint device that restricts the movement range of cargo and animals inside the cargo area of a pick up truck, configured into an animal leash according to claim 7 wherein said flexible composition is woven nylon webbing.

* * * * *